Nov. 25, 1969     G. H. TRIPP     3,479,923

HYDRAULIC TRANSMISSION

Filed June 12, 1967

Guy H. Tripp
INVENTOR.

United States Patent Office 3,479,923
Patented Nov. 25, 1969

3,479,923
HYDRAULIC TRANSMISSION
Guy H. Tripp, 209 N. Columbian,
Bay City, Mich. 48706
Filed June 12, 1967, Ser. No. 656,976
Int. Cl. F01c *1/00, 3/00;* F04c *1/00*
U.S. Cl. 91—97                                         7 Claims

ABSTRACT OF THE DISCLOSURE

A hydraulic transmission comprising a plurality of fluid actuated oppositely rotatable rotors positioned in a stator, said stator fitted with inlet ports, exit ports and valves communicating with said rotors and an output shaft movable through said stator and rotors and rotatable therein with a selected one of said rotors.

---

This invention relates to an improvement on a hydraulic transmission engine, simple in construction, easy to manufacture, few parts, reversible, self-braking and operating from zero to maximum speed with maximum torque. There are no vanes to stick and give trouble and the whole device is self-lubricated. The valve does not stick or fire from friction but releases instantly because of the 7 degree or more taper on the side of the valves. The peripheral annular groove could have some taper to conform to the taper of the valves, the top of the groove being wider than the bottom. The seal is sufficient to prevent excessive fluid leaks and is located on all necessary places around the valves and valve seats. This invention eliminates the universal joint and the clutch when used in a mobile unit. This device can replace the differential by placing this transmission on each drive wheel. This transmission is very advantageous in a hoist, stationary machinery or a boat of any size. Unlike the ordinary transmission that has two or three speeds, my transmission has many speeds. In this transmission you have no worries about snow, ice, water, mud or moisture as it is a sealed enclosure and will work under water. These and other advantages will present themselves as the description is presented and the specification proceeds.

FIG. 1 is a cross-section of this device showing stator 600, rotors 601 and 602, annular peripheral grooves numbered 1 and 2 in rotor 601 and 3 and 4 in rotor 602. The rotors 601 and 602 journal in stator 600 bore and are in close relation thereto.

FIG. 2 is a cross-section taken at 2—2 of FIG. 1 showing rotor 601 which revolves in a clockwise direction. Valves 603 are shown in close relation to inlets 606, outlets 607 and ears 604 in the peripheral annular groove 605.

FIG. 3 is a cross-section taken at 3—3 of FIG. 1 showing rotor 602 which revolves in a counter-clockwise direction. This shows the relation of valves 603, inlets 606, outlets 607 and ears 604 in annular peripheral grooves 605.

FIG. 4 is a detailed view of valve 603 showing the spring 610 and the valve stem 622 which prevents the spring 610 from being bent and keeps it in position. The spring enclosure 612 protects the spring 610 and the nut 625 is adjustable for spring tension on the valve 603. The washer 611 resting on the valve shoulder and held in place by the valve stem 622 causes the valve 603 to seat. The seal 614 held in place by clip 621 keeps excessive fluid from entering the spring enclosure 612.

Figure 4:
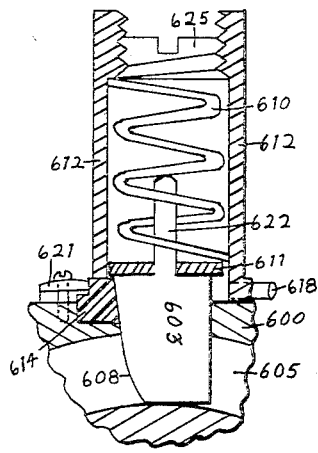

The detailed parts are as follows: A stator 600; a plurality of rotors, two are shown 601 and 602; 603 are the valves; 604 are the ears located in the annular peripheral grooves 605 and are a part of rotor 601 or 602; 606 are the inlets located adjacent the straight side of valves 603; 607 are the outlets located adjacent the taper 620 side of valves; 608 are the cams on the faces of the valves 603; 609 are the cam faces on the ears 604; 610 are the springs shown in FIG. 4; 611 are the washers resting on the valve shoulder shown in FIG. 4; 612 are the spring enclosures shown in FIG. 4; 613 is the square hole in rotors 601 and 602 in which the shaft drives; 614 is the fluid tight seal made of yielding material at the taper 620 side of the valve 603; 615 are the side plates in FIG. 1; 616 are central bores in side plates 615 to admit the square shaft 617 and allow it to freely revolve; 618 is a drain from the spring enclosure 612 (shown in FIG. 4) to return any leakage to the source of supply; 619 are the flat faces of the ears 604 opposite the cam faces 609; 620 is the 7 degree taper opposite the straight side of the valve 603; 621 is the clip that holds seal 614 in place, as shown in FIG. 4; 622 is the valve stem to hold the spring 610 in place; 624 are the expansible chambers in the annular grooves 605; 625 is the nut at the top of a spring enclosure 612 to adjust the tension of the spring 610, as shown in FIG. 4; 626 is the line or space between the two rotors 601 and 602; 623 is the stem on shaft 617 to control the position of shaft 617.

Figure 1:
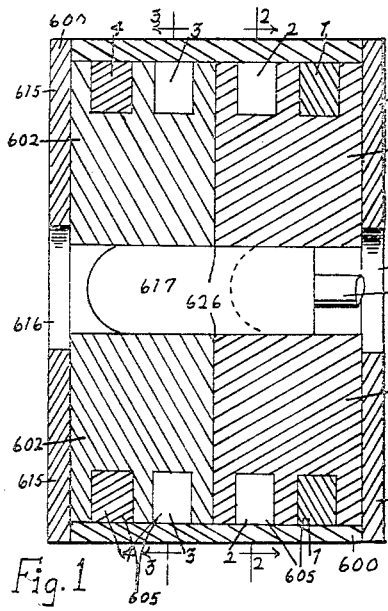

FIG. 1 is a cross-section of this device showing the outer periphery of the rotors 601 and 602 enclosed by the inner surface of the stator 600. Each rotor 601 and 602 contains two annular peripheral grooves 1 and 2 in rotor 601 and 3 and 4 in rotor 602.

Figure 2:
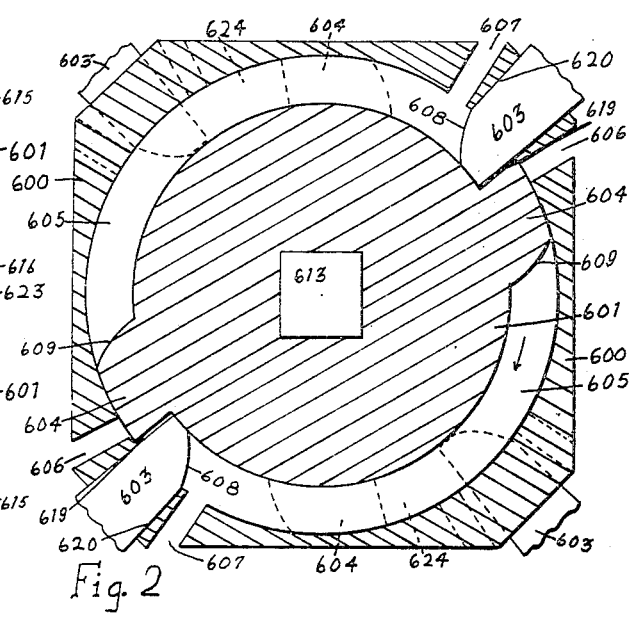
Figure 3:
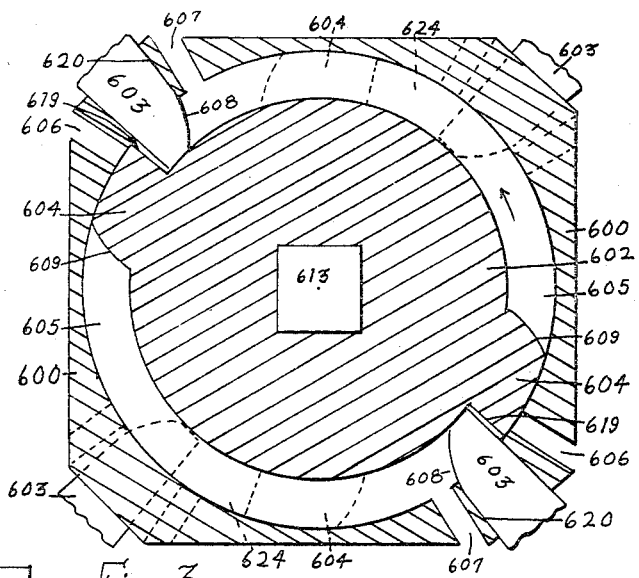
Figure 5:
FIG. 5 is a detailed view of the square shaft extending through either rotor 601 or 602 or both for rotation of one or both to provide braking means rendering device immobile, or means for driving from either rotor.
Figure 6:
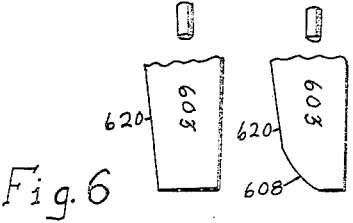
FIG. 6 shows two views of valve 603.

FIG. 2 shows rotor 601 being driven in a clockwise direction and FIG. 3 shows rotor 602 being driven in a counter-clockwise direction. Each annular peripheral groove 605 contains a plurality of ears 604, two are shown in pairs and in opposites on rotor 601 FIG. 2 and on rotor 602 in FIG. 3. Each rotor 601 and 602 have a set of two annular peripheral grooves 605. In alignment and communicating with the annular grooves 605 are inlet 606, outlets 607 and valves 603 all contained in stator 600. In FIG. 2 the ears 604 in groove 2 are shown to be located at right angle to the ears 604 in groove 1 (shown in phantom). In FIG. 3 the ears 604 in groove 3 are shown to be located at right angle to the ears 604 in groove 4 (shown in phantom). The grooves 605 in FIGS. 2 and 3 are divided by ears 604 which are part of the rotors 601 and 602 and in the grooves 605 and extend radially outward to sealingly engage the inner surface of the stator 600. The outer periphery of the ears 604 are in close relation to the inner surface of the stator 600 and serve as a seal and confine the fluid under pressure in the annular groove 605 after the ears 604 pass the valves 603 thus forming an expansible chamber 624. The faces 619 opposite the cam faces 609 of the ears 604 are shaped flat to form a surface against which fluid under pressure is forced causing the rotors 601 and 602 to rotate. The cam faces 608 on the valves 603 are about a 45 degree taper so that the cam faces 609 on the ears 604 will raise the valves 603 with a minimum of power. The cam faces 609 of the ears 604 engage the cam faces 608 of the valves 603 forcing the valves 603 to move radially outward and at the same time form a seal between the ears 604 and the valves 603 to prevent the fluid from escaping from inlets 606 back to the outlets 607 because the valves 603 are held tight against the cam faces 609 of the ears 604 by means of the spring 610 tension and at the same time the ears 604 seal the inlets 606. After the ears 604 have passed the valves 603, uncovered the inlets 606 and the valves 603 have returned to the bottom of the annular grooves 605, an expansible chamber 624 is formed between the ears 604 and the valves 603 the inlet 606 being intermediate the two. The taper 620 holds the valves 603 perfectly and causes the valves 603 to release instantly and leaves no space to allow any fluid to escape while the valves 603 are open. The valves 603 are sealed with yielding material at the taper 620 opposite the straight side of the valves 603. The valves 603 have the same shape as the annular grooves 605 as they must have a fluid tight fit. The valves 603 must also be fluid tight at the bottom of the grooves 605.

In FIG. 1 the plates or walls 615 which seal the ends of the rotors 601 and 602 have central bores 616 to allow the square shaft 617 to slide into the square hole 613 in rotors 601 and 602 and to rotate. When the shaft 617 is moved into either of rotors 601 or 602 to the line or space 626 between the two rotors 601 and 602, the rotor engaged will revolve in its direction, clockwise or counter-clockwise when fluid under pressure is applied into the correct inlet 606. When the shaft 617 is moved on through until both rotors 601 and 602 are engaged the rotors 601 and 602 are locked together and by applying fluid under pressure to both rotors 601 and 602 at the same time the rotors 601 and 602 will be rendered immobile thus braking the device. The square shaft 617 is rounded at one end to allow easy entering from one rotor to the other. On the other end of the shaft 617 is a round stem 623 extending to a sufficient length to enable the shaft 617 to be moved into desired position by any desired means such as hand lever, solenoid or hydraulic. Shaft 617 can be used as a power take-off.

The device operates as follows: Fluid under pressure is admitted into rotor 601 through inlets 606. If one pair of ears 604 are holding one set of valves 603 in open position in groove 2, the other pair of ears 604 will be at right angle in groove 1 (shown in phantom in FIG. 2). So fluid under pressure will enter the two inlets 606 in alignment with groove 1 and force rotor 601 to revolve in a clockwise direction until the ears force valves 603 open in groove 1. At this time the set of ears 604 in groove 2 will be in full driving position. This cycle of events will continue until fluid under pressure is shut off. In other words, as the one set of ears 604 in groove 2 being placed at right angle to the ears 604 in groove 1 (shown in phantom in FIG. 2) and fluid under pressure enters inlets 606 near valves 603, the ears 604 in groove 1 have already passed the inlets 606 and formed an expansible chamber 624 and the rotor 601 is forced in a clockwise direction. When fluid under pressure is admitted into rotor 602, FIG. 3, the reverse or counter-clockwise direction results.

The expansible chamber 624 is shown with dotted lines in groove 1, FIG. 2 and in groove 4 in FIG. 3. Passages 606 and 607 are in communication with a source of supply, passage 607 to return fluid to source of supply. Inlets and outlets can take any desired shape and size being properly positioned. Valves 603 are held in place by any desired means (spring 610 means are shown).

I claim:
1. A hydraulic motor comprising a stator containing a large central bore and end walls spaced along the axis of said bore and closing the ends thereof, a plurality of rotors rotatable in opposing directions about the axis of said bore, the outer peripheral surface of said rotors being in close relation to the inner surface of said stator bore and journalling said rotors in said stator, a plurality of annular grooves in each of said outer peripheral surfaces of said rotors, said annular grooves being sealed by the inner surface of said stator, the said annular grooves being sealingly divided by ears, said ears being a part of said rotors and extending outward to engage the inner surface of said stator, each of said ears having a flat surface contra to one direction of rotation and a cam surface on the opposite end thereof, a plurality of inlet passages in alignment and communicating with each of said annular grooves, the other end of said passages communicating with said outer surface of said stator, a valve slidably mounted in said stator adjacent to and displaced from each said inlet contra to said one direction of rotation and dividing the volume in said groove between said ears, each said valve having a cam surface on the end thereof contra to said one direction of rotation, said cam surfaces of said valves arranged to cooperate with said cam surfaces of said ears thereby to raise said valves from said groove as said ears pass said valves, said inlet being between said valve and said ears and in alignment with said annular groove, said flat surfaces of said ears being close to said inlets thereby to form expansible chambers therewith, outlet passages in said stator in alignment and communicating with each of said annular grooves adjacent to and displaced from each said valve contra to said one direction of rotation, each said outlet communicating with the outer surface of said stator, and inlet passages, valves, ears and outlet passages for at least another set of said annular grooves wherein said valves and passages all in alignment with said grooves are arranged for the opposite direction of rotation, said inlet passages, valves and outlet passages in alignment with said annular groove being all contained in said stator, a square opening through the center of each of said rotors, all of said rotor openings being in axial alignment with one another, an opening through each of said stator end walls of a larger size than the rotor openings and in axial alignment therewith, and a square output shaft movable through said stator and rotor openings and rotatable therein with a selected one of said rotors, said output shaft being rounded at one end.

2. Device as defined in claim 1 having spring enclosures, each said spring enclosure completely enclosing a spring and valve stem in alignment and communicating with each said valve and attached to said stator, means of spring adjustment, and means to drain said spring enclosure.

3. Device as defined in claim 1 having an enclosure over each of said valves and valve stems, means to pressure said valves into a closing and holding position.

4. Device as defined in claim 1 having a multiplicity of valves, each of said valves having a taper on at least one side.

5. Device as defined in claim 1 and containing seals of yielding material adjacent to at least one side of each of said valves contained in said stator.

6. Device as defined in claim 1 in which each of said rotors contains at least two annular grooves, a pair of ears placed opposite each other in each annular groove and so arranged that one said pair of ears in one groove is at right angle to the said pair of ears in the adjoining groove.

7. Device as defined in claim 4 wherein the taper on the side of each of said valves is at least 7 degrees.

References Cited

UNITED STATES PATENTS

| | | | |
|---|---|---|---|
| 151,472 | 6/1874 | Chavous | 91—97 |
| 343,831 | 6/1886 | Mills | 91—97 |
| 615,597 | 12/1898 | Walker | 91—97 X |
| 739,805 | 9/1903 | Andersen | 91—105 |
| 801,662 | 10/1905 | Guthrie | 91—100 |
| 1,248,518 | 12/1917 | MacKinnon | 91—97 |
| 1,301,989 | 4/1919 | Weidenbach | 91—105 X |
| 3,080,722 | 3/1963 | Molnar | 91—105 X |

FOREIGN PATENTS 9,316    1899    Great Britain.

EVERETTE A. POWELL, Jr., Primary Examiner

U.S. Cl. X.R.

91—105